United States Patent
Sudhakar

(10) Patent No.: US 9,189,412 B2
(45) Date of Patent: Nov. 17, 2015

(54) APPARATUS AND METHOD FOR OPERATING A PROCESSOR WITH AN OPERATION CACHE

(71) Applicant: MIPS Technologies, Inc., Sunnyvale, CA (US)

(72) Inventor: Ranganathan Sudhakar, Santa Clara, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 161 days.

(21) Appl. No.: 13/789,443

(22) Filed: Mar. 7, 2013

(65) Prior Publication Data

US 2014/0258624 A1    Sep. 11, 2014

(51) Int. Cl.
 *G06F 12/00* (2006.01)
 *G06F 12/08* (2006.01)
 *G06F 7/57* (2006.01)
 *G06F 9/38* (2006.01)

(52) U.S. Cl.
CPC .............. *G06F 12/0875* (2013.01); *G06F 7/57* (2013.01); *G06F 9/383* (2013.01); *G06F 9/3824* (2013.01); *G06F 9/3832* (2013.01)

(58) Field of Classification Search
CPC ..... G06F 12/0875; G06F 7/57; G06F 9/3824; G06F 9/383; G06F 9/3832
See application file for complete search history.

(56) References Cited

U.S. PATENT DOCUMENTS

| 6,253,287 B1 * | 6/2001 | Green ........................... 711/125 |
| 2002/0120814 A1 * | 8/2002 | Lee ............................... 711/118 |

* cited by examiner

*Primary Examiner* — Cheng-Yuan Tseng
*Assistant Examiner* — Alan Otto
(74) *Attorney, Agent, or Firm* — Cooley LLP

(57) ABSTRACT

A processor includes a computation engine to produce a computed value for a set of operands. A cache stores the set of operands and the computed value. The cache is configured to selectively identify a match and a miss for a new set of operands. In the event of a match the computed value is supplied by the cache and a computation engine operation is aborted. In the event of a miss a new computed value for the new set of operands is computed by the computation engine and is stored in the cache.

5 Claims, 4 Drawing Sheets

APPARATUS AND METHOD FOR OPERATING A PROCESSOR WITH AN OPERATION CACHE

FIELD OF THE INVENTION

This invention relates generally to processor architectures. More particularly, this invention relates to operating a processor with an operation cache.

BACKGROUND OF THE INVENTION

Instruction latency minimization is an integral part of high-performance processor design. Double digit clock cycles are typically required for an operation like integer division, which computes a quotient and a remainder. Simpler integer operations execute in the low single digits of clock cycles. There is an ongoing need to improve processing latency to enhance overall processor performance.

SUMMARY OF THE INVENTION

A method includes simultaneously applying operands to a computation engine and a cache. The operands are compared to stored operands in the cache to selectively identify a match and a miss. The cache outputs a stored value in the event of a match. The computation engine outputs a computed value in the event of a miss.

A processor includes a computation engine to produce a computed value for a set of operands. A cache stores the set of operands and the computed value. The cache is configured to selectively identify a match and a miss for a new set of operands. In the event of a match the computed value is supplied by the cache and a computation engine operation is aborted. In the event of a miss a new computed value for the new set of operands is computed by the computation engine and is stored in the cache.

A non-transitory computer readable storage medium comprises executable instructions to define a processor with a computation engine to produce a computed value for a set of operands and a cache to store the set of operands and the computed value. The cache is configured to selectively identify a match and a miss for a new set of operands. In the event of a match the computed value is supplied by the cache and a computation engine operation is aborted. In the event of a miss a new computed value for the new set of operands is computed by the computation engine and is stored in the cache.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
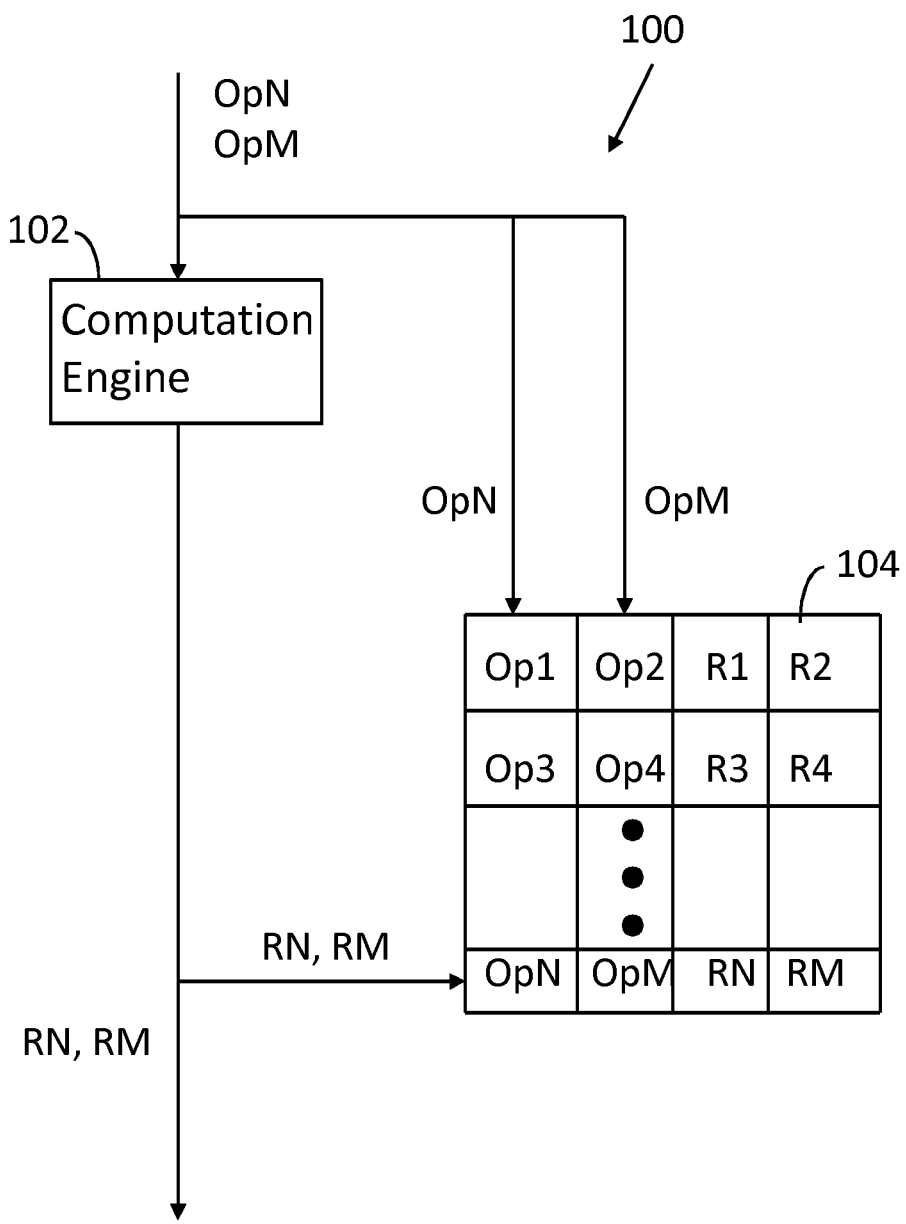
FIG. 1 illustrates the loading of an operation cache in accordance with an embodiment of the invention.

FIG. 1 illustrates a segment of a processor 100 configured in accordance with an embodiment of the invention. The processor 100 includes a computation engine 102, which receives operands, OpN and OpM. The operands OpN and OpM are also applied to an operation cache 104. In this embodiment, the computation engine 102 is a divide engine. Therefore, each row of the operation cache 104 stores two operands, a quotient and a remainder. For example, the first row shows operands Op1 and Op2, a first result R1 (e.g., a quotient) and a second result R2 (e.g., a remainder). The last row shows the newly arrived operands OpN and OpM. When the computation engine 102 completes its computation, the results RN and RM are available for further processing, but are also loaded into the cache 104, as shown. Other mathematical operations, such as addition and subtraction, produce a single result. In such a case, a cache line entry includes a first operand, a second operand and a single result.

Figure 2:
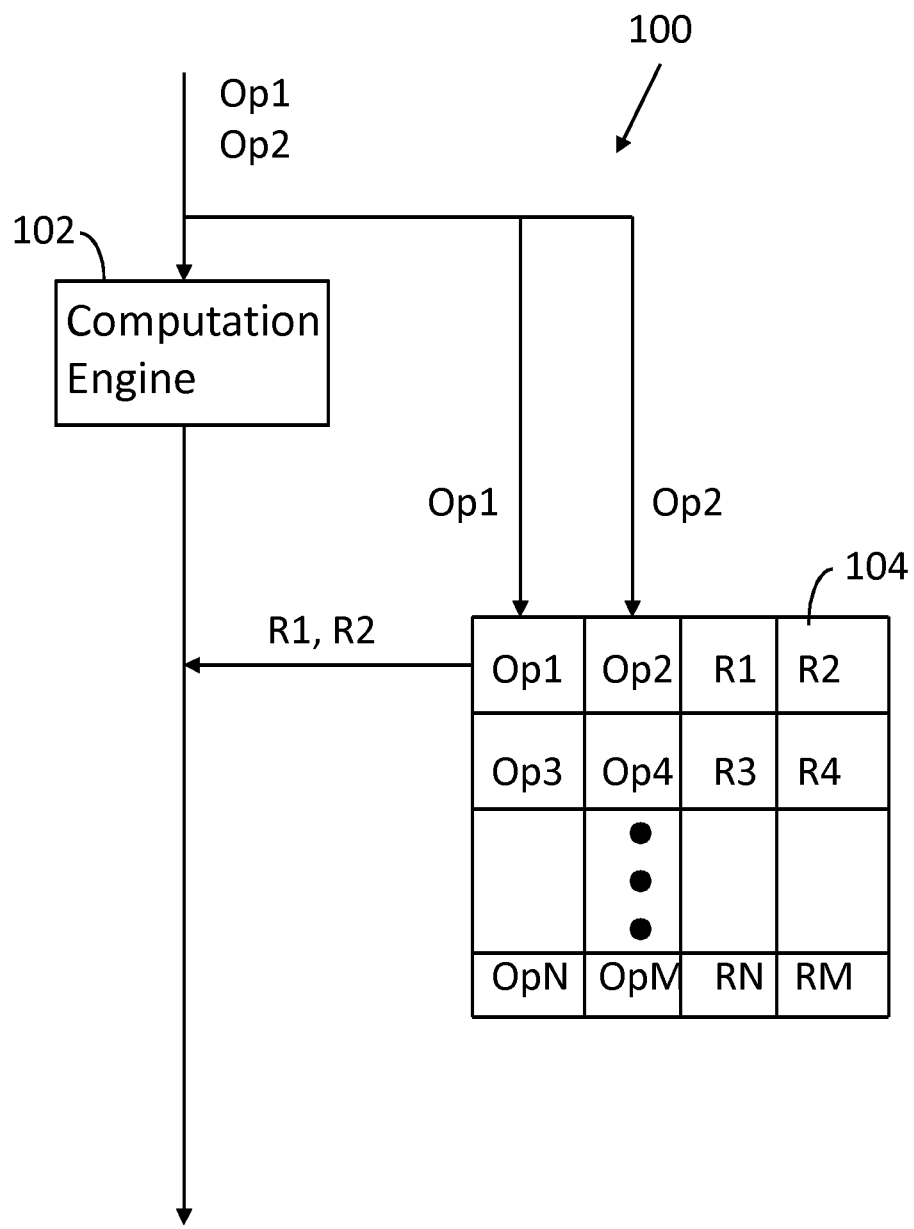
FIG. 2 illustrates the utilization of an operation cache in accordance with an embodiment of the invention.

FIG. 2 illustrates the computation engine 102 receiving operands Op1 and Op2, which are also applied to the cache 104. In this case, the operands exist in the first row of the cache 104. Therefore, the associated result R1 and result R2 are supplied from the cache 104. The operation at the computation engine 102 may be aborted since the result is more quickly obtained from the cache 104.

Figure 3:
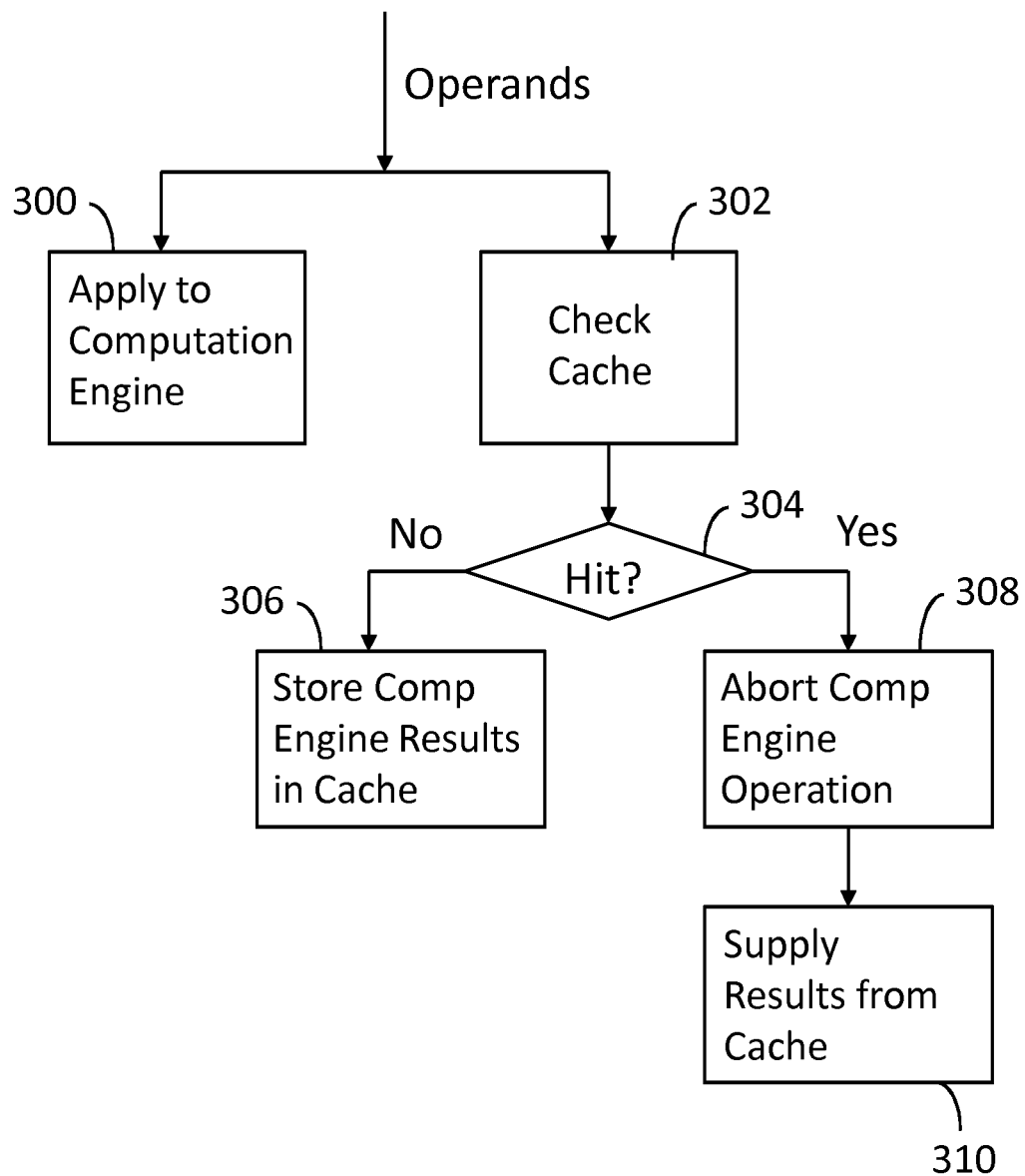
FIG. 3 illustrates processing operations associated with an embodiment of the invention.

FIG. 3 illustrates processing operations associated with an embodiment of the invention. Operands are applied to a computation engine 300 while the cache is checked for the same operands 302. If there is a cache miss (304—No), the computation engine completes its computation and stores the results in the cache 306. If there is a cache hit (304—Yes), the computation engine operation is aborted 308 and the results are supplied from the cache 310.

Figure 4:
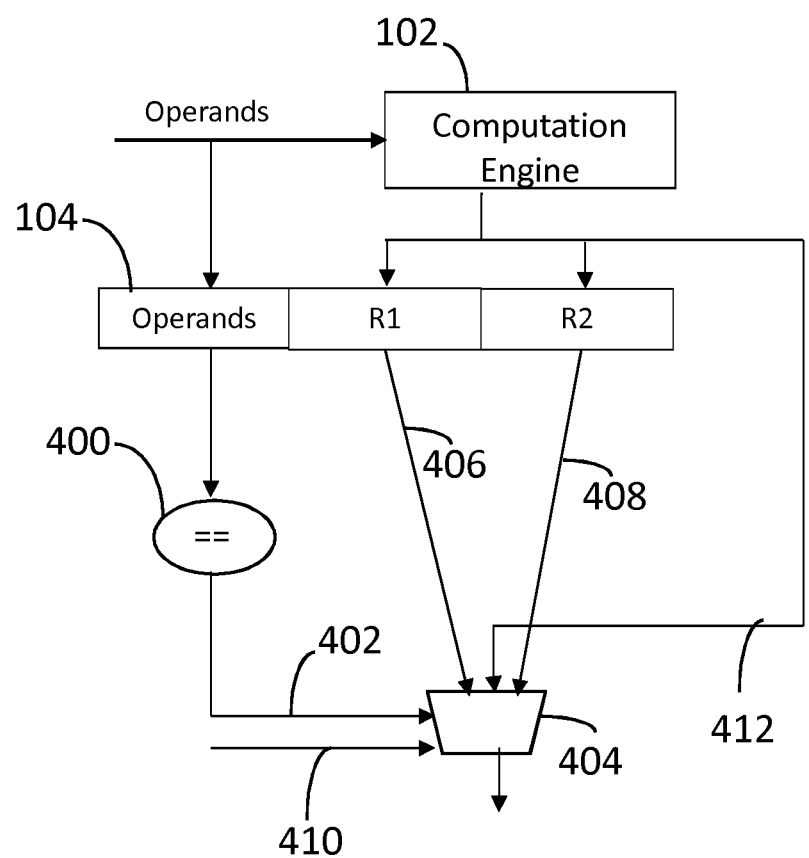
FIG. 4 illustrates circuit components utilized to implement an embodiment of the invention.

FIG. 4 illustrates circuit components that may be used to implement an embodiment of the invention. The figure illustrates operands applied to a computation engine 102 and cache 104. A comparator 400 may be used to identify matched operands. In the event of a match, select line 402 of multiplexer 404 is used to read lines 406 and 408, which provide result R1 and result R2 from the cache 104. In the event of a cache miss, select line 410 is active to read the results from the computation engine 102 on line 412. The results are also written to the cache 104.

The performance benefits of the invention can be illustrated with an example. Consider the following pseudo code fragment:

```
LW r1, [r4]  // r1 = 9, but can vary during execution
LW r2, [r5]  // r2 = 3, but can vary during execution
DIV r3, r1, r2  // r3 = r1/r2 = 9/3 = 3, will vary as inputs vary
SW [r9], r3
LW r6, 4[r8]  // Assume r8+4 == r9
```

The division (DIV) instruction computes the quotient of 9/3 and stores the result out to memory. Later it is loaded from memory in a different procedure. This sequence is repeated many times and frequently the DIV instruction's operands are a numerator of 9 and a denominator of 3. As a result, it often computes a result of 3. During execution, the DIV takes more than a dozen clock cycles to compute, resulting in poor performance in this stretch of code. It is not possible to speed up the divide latency by more than a few cycles without hurting processor frequency, resulting in diminishing returns on performance. This is because divide algorithms must handle all possible inputs, resulting in various checking and normalization steps before the actual division can be started and some further overhead before the result can be forwarded to a waiting instruction. Further, even though the divide always produces the same result, the compiler cannot deduce this at compile time, due to issues like aliasing, nor can it eliminate the store word (SW) and load word (LW) pair if they lie in different translation modules, making it even more imperative to have low divide latency.

The division instruction frequently has the same input operands during execution. Thus, although it may take many cycles to compute the result the first time a given pair of inputs is seen by the divide engine, the result of the division operation is placed in an operation cache. The next time the multiply/divide unit is called upon to perform a division, the operation cache is checked in parallel with initiating the division operation. If the result is in the cache, the results are supplied from the cache and the actual long-latency operation is cancelled.

An ordinary cache is a memory that stores the recent results of accessing a larger memory. Later accesses can be satisfied from the cache, saving latency as well as bandwidth and power of the larger memory. Such a cache is written when a store instruction is seen and read when a load instruction is seen. An operation cache is written when a particular set of (opcode, operands) is seen and read when the same operation is seen in the future. Thus, an operation cache exhibits the same property of temporal locality as an ordinary cache. Ordinary caches usually also exploit spatial locality. When a load instruction reads a particular memory location, the cache controller brings in not just the requested word, but also the contents of adjacent locations within the same cache line. Since it is empirically probable that future load instructions will want to access those nearby locations, access latency is reduced. Operation caches can exhibit a similar useful property. It is simple to compute the remainder of a division at the same time the quotient is requested. The operation cache can then save both the quotient and remainder and if a future instruction requests the remainder, it can be provided without repeating the computation.

The same sort of look ahead is applicable to multiplication, since most programs request the low word of the product but sometimes request the high word also. It usually costs just one extra clock cycle to compute the high word after the low word is generated. On an instruction set that has separate instructions for high and low parts of a multiply, such an operation cache allows the same performance as an instruction set with accumulators, yet retains all the considerable benefits of eliminating accumulators from the instruction set.

Consider a very simple operation cache that is being used to cache the results of ADD and SUB instructions. An entry in the cache would have four fields: an Opcode field, two operands and a result. If the program were to encounter the ADD instruction with input operands 5 and 3, an entry (5, 3; ADD: 8) may be created because when the Opcode ADD is applied to 5 and 3, the result is 8. Subsequently, the cache can satisfy future computations that try to ADD 5 and 3 and produce 8 without doing the addition. Next, suppose the program encounters a SUB instruction with input operands 5 and 3. The result of 2 would be computed and a second entry would be created in another row of the operation cache, with the fields (5, 3; SUB: 2). Note that this SUB instruction was a miss in the cache, not a hit, because this was the first time 5-3 was attempted by the program. So the SUB takes a long latency to compute because it is a MISS in the cache.

Instead, if we were to augment the operation cache so that every time it encounters an ADD instruction, it also computes the SUB of those same input operands, we could alter the entries to store a second Opcode and a second result. In other words, the first ADD 5,3 would place (5, 3; ADD: 8, SUB: 2) into one entry of the cache. This entry is saying that when 5 and 3 are ADDed, the result is 8, when they are SUBtracted, the result is 2. Note that this entry is populated when the ADD instruction is seen, the SUB has not yet been seen. Thus, one is speculating that if the program encounters the addition of 2 numbers, it might encounter the subtraction of the same two numbers later. If and when a SUB instruction with operands 5 and 3 is later encountered, the result can be supplied from the cache and an actual subtraction need not be performed. This is an improvement over the basic operation cache described in the previous paragraph, since the operation cache is able to store multiple Opcodes and Results for the same set of input Operands.

Unlike ordinary caches, an operation cache need not be very large to be effective. For example, a 4-entry fully-associative cache works well for quite a few programs. If the operation cache is used to store floating-point results, a larger cache is needed to be effective.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known non-transitory computer usable medium such as semiconductor, magnetic disk, or optical disc (e.g., CD-ROM, DVD-ROM, etc.). It is understood that a CPU, processor core, microcontroller, or other suitable electronic hardware element may be employed to enable functionality specified in software.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:
1. A method, comprising:
simultaneously applying operands and a received operation code to a computation engine circuit component and a cache; using the operands at the computation engine circuit component to speculatively compute a related value based upon a speculative operation code; loading the speculative operation code and the related value into the cache; comparing the operands to stored operands in the cache to selectively identify a match and a miss; outputting from the cache a stored value in the event of a match; outputting from the computation engine circuit component a computed value in the event of a miss; and storing the received operation code, the speculative operation code, the operands, the related value and the computed value in the same cache line.

2. A processor, comprising: a computation engine circuit component to produce a computed value for a set of operands and a received operation code, wherein the computation engine circuit component uses the operands to speculatively compute a related value based upon a speculative operation code and loads the speculative operation code and the related value into the cache; and a cache to store the set of operands, the computed value, the received operation code, the speculative operation code and the related value; wherein the cache is configured to selectively identify a match and a miss for a new set of operands, wherein in the event of a match the computed value is supplied by the cache and a computation engine circuit component operation is aborted, and in the event of a miss a new computed value for the new set of operands is computed by the computation engine circuit component and is stored in the cache; and wherein the received operation code, the speculative operation code, the set of operands, the related value and the computed value are stored in the same cache line.

3. The processor of claim 2 wherein the cache has four rows or less.

4. A non-transitory computer readable storage medium comprising executable instructions to define a processor with: a computation engine circuit component to produce a computed value for a set of operands and a received operation code, wherein the computation engine circuit component uses the operands to speculatively compute a related value based upon a speculative operation code and loads the speculative operation code and the related value into the cache; and a cache to store the set of operands, the computed value, the received operation code, the speculative operation code and the related value; wherein the cache is configured to selectively identify a match and a miss for a new set of operands, wherein in the event of a match the computed value is supplied by the cache and a computation engine circuit component operation is aborted, and in the event of a miss a new computed value for the new set of operands is computed by the computation engine circuit component and is stored in the cache; and wherein the executable instructions define a cache wherein an original operation code, the speculative operation code, the set of operands, the related value and the computed value are stored in the same cache line.

5. The non-transitory computer readable storage medium of claim 4 wherein the executable instructions define a computation engine circuit component that is a divide engine to produce computed values including a quotient and a remainder.

* * * * *